(12) United States Patent
Jin et al.

(10) Patent No.: US 12,334,491 B2
(45) Date of Patent: Jun. 17, 2025

(54) BATTERY CELL JIG THAT BOLT-FASTENS THROUGH UNIFORM PRESSURE

(71) Applicant: LG ENERGY SOLUTION, LTD., Seoul (KR)

(72) Inventors: So Yeon Jin, Daejeon (KR); Seung Hwa Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 278 days.

(21) Appl. No.: 17/799,778

(22) PCT Filed: Aug. 10, 2021

(86) PCT No.: PCT/KR2021/010553
§ 371 (c)(1),
(2) Date: Aug. 15, 2022

(87) PCT Pub. No.: WO2022/035176
PCT Pub. Date: Feb. 17, 2022

(65) Prior Publication Data
US 2023/0083153 A1    Mar. 16, 2023

(30) Foreign Application Priority Data
Aug. 11, 2020    (KR) .................. 10-2020-0100258

(51) Int. Cl.
*H01M 10/04*    (2006.01)
*B23P 19/06*    (2006.01)
*B25B 1/02*    (2006.01)

(52) U.S. Cl.
CPC ....... *H01M 10/0404* (2013.01); *B23P 19/067* (2013.01); *B25B 1/02* (2013.01)

(58) Field of Classification Search
CPC ......... H01M 10/0404; H01M 10/0525; H01M 10/4285; H01M 50/105; H01M 50/264;
(Continued)

(56) References Cited

U.S. PATENT DOCUMENTS 3,905,254 A * 9/1975 Palatnick ................ B25B 17/00
                                                              81/57.3
2013/0047790 A1* 2/2013 Shah ....................... B25B 17/00
                                                              81/57.22
(Continued)

FOREIGN PATENT DOCUMENTS

CN    103328199 A       9/2013
CN    105690302 A  *    6/2016
(Continued)

OTHER PUBLICATIONS

International Search Report (with partial translation) and Written Opinion dated Dec. 3, 2021 issued in corresponding International Patent Application No. PCT/KR2021/010553.
(Continued)

*Primary Examiner* — C. A. Rivera
(74) *Attorney, Agent, or Firm* — Morgan, Lewis & Bockius LLP

(57) ABSTRACT

The present technology relates to a battery cell jig for fastening bolts with uniform pressure when fixing a battery cell between first and second plates by applying the same rotating force to a plurality of bolt fastening units. The battery cell jig includes first and second plates arranged to face each other, n bolt fastening units, where the n is an integer equal to or greater than 2, a rotating member which is installed on one surface of the first plate or the second plate and is installed on an opposite side of a surface where the first and second plates face each other, and a driving unit which transmits rotating force of the rotating member to each of the n bolt fastening units.

18 Claims, 7 Drawing Sheets

(58) Field of Classification Search
CPC . B23P 19/069; B60B 2340/50; B60B 29/008; Y02E 60/10
USPC .............................................. 81/57.22, 57.36
See application file for complete search history.

(56) References Cited

U.S. PATENT DOCUMENTS

| | | | |
|---|---|---|---|
| 2013/0306237 | A1 | 11/2013 | Nagasaka et al. |
| 2017/0222197 | A1* | 8/2017 | Sawada ................. H01M 50/55 |
| 2021/0184272 | A1 | 6/2021 | Kwak et al. |

FOREIGN PATENT DOCUMENTS

| CN | 106926150 A | 7/2017 | | |
|---|---|---|---|---|
| CN | 111122331 A | 5/2020 | | |
| CN | 111226122 A | 6/2020 | | |
| KR | 19990019274 U | 6/1999 | | |
| KR | 10-2001-0035869 A | 5/2001 | | |
| KR | 10-2001-0060115 | 7/2001 | | |
| KR | 10-2003-0065928 | 8/2003 | | |
| KR | 10-0524497 | 10/2005 | | |
| KR | 20060126006 A | 12/2006 | | |
| KR | 10-2013-0010735 | 1/2013 | | |
| KR | 2014002718 A * | 1/2014 | ............. | B30B 15/34 |
| KR | 10-2016-0004661 | 1/2016 | | |
| KR | 10-2017-0042082 A | 4/2017 | | |
| KR | 10-2018-0131004 | 12/2018 | | |
| KR | 10-2018-0137346 A | 12/2018 | | |
| KR | 10-2018-0137705 | 12/2018 | | |
| KR | 10-1983849 B1 | 9/2019 | | |
| KR | 10-2020-0035594 A | 4/2020 | | |
| KR | 20200035594 A * | 4/2020 | | |

OTHER PUBLICATIONS

Extended European Search Report dated Oct. 18, 2024 issued in European Patent Application No. 21856182.7. Note: KR 2013 0010735 A cited therein is already of record.
Office Action dated Apr. 18, 2025 for the corresponding Chinese Patent Application No. 202180013268.7.

* cited by examiner

BATTERY CELL JIG THAT BOLT-FASTENS THROUGH UNIFORM PRESSURE

TECHNICAL FIELD

This application claims the benefit of priority based on Korean Patent Application No. 10-2020-0100258, filed on Aug. 11, 2020, and the entire contents of the Korean patent application are incorporated herein by reference.

The present invention relates to a battery cell jig for fastening bolts with uniform pressure.

BACKGROUND ART

In recent years, as the price of energy sources increases due to the depletion of fossil fuels and the interest of environmental pollution is amplified, the demand for environmentally friendly alternative energy sources has become an indispensable factor for future life. As such, various researches on power generation technologies such as nuclear power, solar power, wind power, and tidal power have been continued, and electric power storage devices for more efficient use of such generated energy have also been attracting much attention.

In particular, with the development of technology and demand for mobile devices, the demand for batteries as energy sources is rapidly increasing, and accordingly, a lot of researches on batteries capable of meeting various demands have been conducted.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having advantages such as high energy density, discharge voltage, and output stability.

A secondary battery is manufactured by accommodating an electrode assembly in a battery case and injecting electrolyte, followed by a battery activation step. At this time, the battery activation step includes the process of charging and discharging the secondary battery in the conditions necessary for activation after mounting the secondary battery in a cell jig. Such a cell jig is mainly used to charge or discharge the secondary battery in the battery activation step, as well as used for performance evaluation purposes of the secondary battery.

FIG. 1 is a schematic diagram of a conventional battery cell jig for evaluating performance of a secondary battery. As shown in FIG. 1, a general cell jig presses and fixes a battery cell 11 through a first plate 12 and a second plate 13 which are placed at the upper side and the lower side of the battery cell 11, respectively.

Such a cell jig 10 performs bolt fastening using nuts 15 and bolts 14 which penetrate the first plate 12 and the second plate 13 to fix the battery cell 11. Specifically, conventionally, the first and second plates 12 and 13 have a plurality of holes through which the bolt 14 is penetrated, and the bolt 14 and the nut 15 are fastened in the plurality of holes.

Further, the bolt 14 and the nut 15, which are fastened in a plurality of holes, are fastened for each region, and they may not be fastened with uniform force. In particular, even if bolt fastening is performed using a torque wrench which applies uniform force, bolt fastening may not be uniformly performed for each region according to a person who performs bolt fastening.

DISCLOSURE

Technical Problem

The present invention is believed to solve at least some of the above problems. For example, an aspect of the present invention provides a battery cell jig for uniformly fastening bolts when fixing a battery cell between first and second plates by applying uniform rotating force to a plurality of bolt fastening units.

Technical Solution

The present invention relates to a battery cell jig for fastening bolts with uniform pressure. In one embodiment, a battery cell jig according to the present invention includes: first and second plates arranged to face each other; n bolt fastening units including a bolt and a nut to allow the first plate to be fastened to the second plate to press a battery cell in a state that the battery cell is interposed between the first plate and the second plate; a rotating member which is installed on one surface of the first plate or the second plate and is installed on an opposite side of a surface where the first and second plates face each other; and a driving unit which transmits rotating force of the rotating member to each of the n bolt fastening units, wherein the n is an integer equal to or greater than 2.

In one embodiment, the driving unit includes: a first gear unit which is connected to the rotating member and is rotated by rotation of the rotating member; a second gear unit which is engaged with the first gear unit and transmits rotating force in a direction other than an axial direction of the first gear unit; and a third gear unit which is engaged with the second gear unit and transmits rotating force in a direction other than an axial direction of the second gear unit. At this time, the third gear unit is connected to the bolt fastening unit in a region opposite to a region where the third gear unit is engaged with the second gear unit.

In another embodiment, the driving unit includes: a first gear unit which is connected to the rotating member and is rotated by rotation of the rotating member; n second gear units which are engaged with the first gear unit in a perpendicular direction and are rotated in a direction perpendicular to a rotating direction of the first gear unit; and a third gear unit which is engaged with each of the second gear units in a perpendicular direction and is rotated in a direction perpendicular to a rotating direction of the second gear unit. At this time, the third gear unit is connected to the bolt fastening unit in a region opposite to a region where the third gear unit is engaged with the second gear unit.

In a specific example, the first gear unit includes: a first rotation shaft having one side connected to the rotating member; and a first driving bevel gear which is fixed at the other side of the first rotation shaft and is rotated by the rotating member. Further, the second gear unit includes: a second rotation shaft; a first follower bevel gear which is fixed at one side of the second rotation shaft and is engaged with the first driving bevel gear; and a second driving bevel gear which is fixed at the other side of the second rotation shaft and is rotated by rotation of the first follower bevel gear. Further, the third gear unit includes: a third rotation shaft; and a third follower bevel gear which is fixed at one side of the third rotation shaft and is engaged with the second driving bevel gear, and the other side of the third rotation shaft is connected to the bolt fastening unit.

In a more specific example, the driving unit includes: a first gear unit including a first rotation shaft connected to the rotating member and a first driving bevel gear which is fixed at an end of the first rotation shaft and is rotated by the rotating member; n second gear units including a first follower bevel gear engaged with the first driving bevel gear, a second rotation shaft connected to the first follower bevel gear, and a second driving bevel gear which is fixed at an end of the second rotation shaft and is rotated by rotation of the first follower bevel gear; and a third gear unit including a second follower bevel gear engaged with the second driving bevel gear, and a third rotation shaft connected to the second follower bevel gear. At this time, the third gear unit is connected to the bolt fastening unit in a region opposite to a region where the third gear unit is engaged with the second driving bevel gear.

In further another embodiment, the battery cell jig further includes a pressing plate which is laminated on one surface of the first plate. Further, the pressing plate may have a driving unit built therein. Further, the driving unit may be detachable from the first plate.

Further, the battery cell jig according to the present invention may include a sensor unit. In a specific example, the battery cell jig according to the present invention further includes a sensor unit which is arranged between the first plate and the pressing plate and measures a changing pressure value between the first plate and the pressing plate during rotation of the rotating member.

At this time, the battery cell jig may further include an output unit which is connected to the sensor unit and outputs the pressure value, and the sensor unit may be a pressure sensor having a planar structure.

Advantageous Effects

According to a battery cell jig for fastening bolts with uniform force of the present invention, it is possible to uniformly fasten bolts when fixing a battery cell between first and second plates by applying the same rotating force to a plurality of bolt fastening units.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Hereinafter, the present invention will be described in detail with reference to the drawings.

The present invention provides a battery cell jig for fastening bolts with uniform pressure. Generally, a conventional battery cell jig performs bolt fastening using separate bolts and nuts which penetrate through a first plate and a second plate in order to fix a battery cell. Herein, the pressure applied to the battery cell may be different for each location according to the order of fastening bolts and nuts and the worker's inclination.

As such, the inventors of the present invention invented a battery cell jig for uniformly fastening bolts when fixing a battery cell between first and second plates. More specifically, the present invention provides a battery cell jig for uniformly fastening bolts when fixing a battery cell between first and second plates by applying the same rotating force to a plurality of bolt fastening units.

Figure 1:
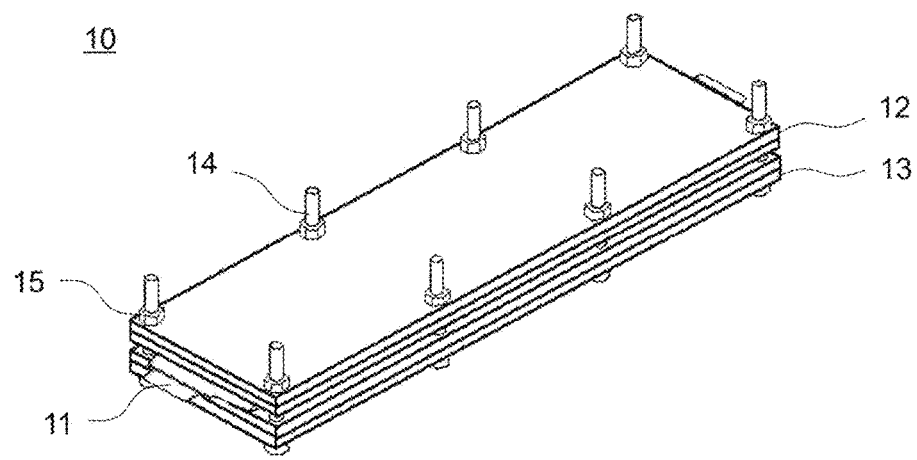
FIG. 1 is a schematic diagram of a conventional battery cell jig for evaluating performance of a secondary battery.
Figure 2:
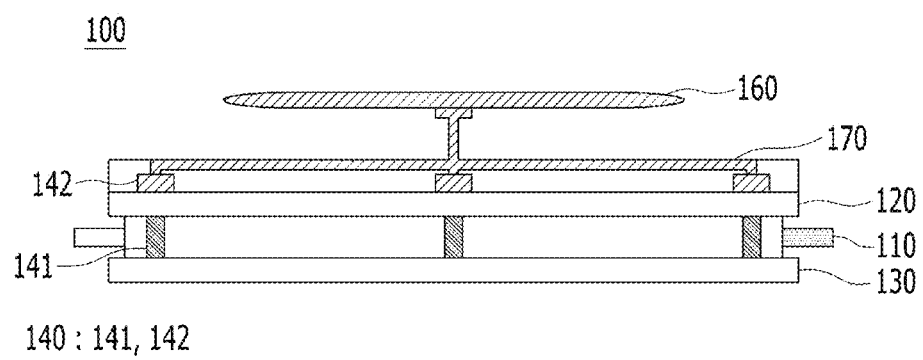
FIG. 2 is a schematic view of a battery cell jig according to an embodiment of the present invention.
Figure 3:
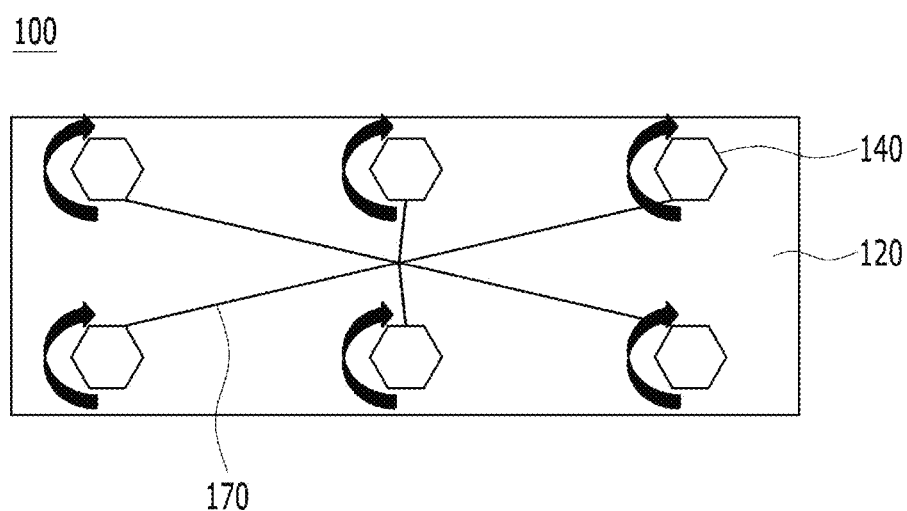
FIG. 3 is a schematic diagram showing an operation mechanism of the bolt fastening unit of a battery cell jig according to one embodiment of the present invention.

FIG. 2 is a schematic view of a battery cell jig according to an embodiment of the present invention, and FIG. 3 is a schematic diagram showing an operation mechanism of the bolt fastening unit of a battery cell jig according to one embodiment of the present invention.

Referring to FIGS. 2 and 3, a battery cell jig 100 according to the present invention includes: first and second plates 120 and 130 arranged to face each other; n (n is an integer equal to or greater than 2) bolt fastening units 140 including a bolt and a nut to allow the first plate 120 to be fastened to the second plate 130 to press a battery cell 110 in a state that the battery cell 110 is interposed between the first plate 120 and the second plate 130; a rotating member 160 which is installed on one surface of the first plate 120 or the second plate 130 and is installed on an opposite side of a surface where the first and second plates 120 and 130 face each other; and a driving unit 170 which transmits rotating force of the rotating member 160 to each of the n bolt fastening units 140.

In a specific example, the battery cell jig 100 according to the present invention may fasten bolts in n bolt fastening units 140 with uniform force regardless of the fastening location of the bolt fastening unit 140 when fixing a battery cell 110 between first and second plates 120 and 130 as the driving unit 170 transmits received rotating force to the n bolt fastening units 140.

As such, the battery cell jig 100 according to the present invention may minimize the non-uniform pressure according to the fastening location of the bolt fastening unit 140 or the fastening error of the bolts 141 and nuts 142. Further, n bolt fastening units 140 can be fastened with uniform force with one time of handling of the rotating member 160.

Herein, the battery cell 110, which is interposed between the first and second plates 120 and 130, may be a pouch-type unit cell. Specifically, the pouch type unit cell may have a structure that an electrode assembly having a positive electrode/separator/negative electrode structure is embedded in an exterior material of the laminate sheet in a state that is connected to electrode leads formed outside the exterior material. Further, the electrode leads may be drawn to the outside of the sheet and may be extended in the same or opposite direction to each other.

Further, the first and second plates 120 and 130 may be general plates which are used when evaluating charge/discharge characteristics of the battery cell 110, for example, aluminum plates. Herein, the first and second plates 120 and 130 may mean upper and lower plates, respectively.

Further, the bolt fastening unit 140 means a bolt 141 and a nut 142, and n bolt fastening units 140 may be provided in the present invention. Herein, the n may be an integer equal to or greater than 2, and specifically one of 2 to 12, one of 4 to 10, or one of 6 to 8. For example, 6 bolt fastening units 140 may be provided. However, the present invention is not limited thereto.

Further, the driving unit 170 of the battery cell jig according to the present invention may transmit rotating force of the rotating member 160 to n bolt fastening units 140. This means that rotating force of the rotating member 160 is transmitted to the bolt 141 or the nut 142. If rotating force of the rotating member 160 is transmitted to the bolt 141, the bolt may be fastened by rotating the bolt 141 in a state in which the nut 142 is fixed. Further, if rotating force of the rotating member 160 is transmitted to the nut 142, the bolt may be fastened by rotating the nut 142 in a state in which the bolt 141 is fixed.

Further, the rotating member 160 may fasten or separate the bolts 141 and nuts 142 by clockwise or counterclockwise rotation.

Figure 4:
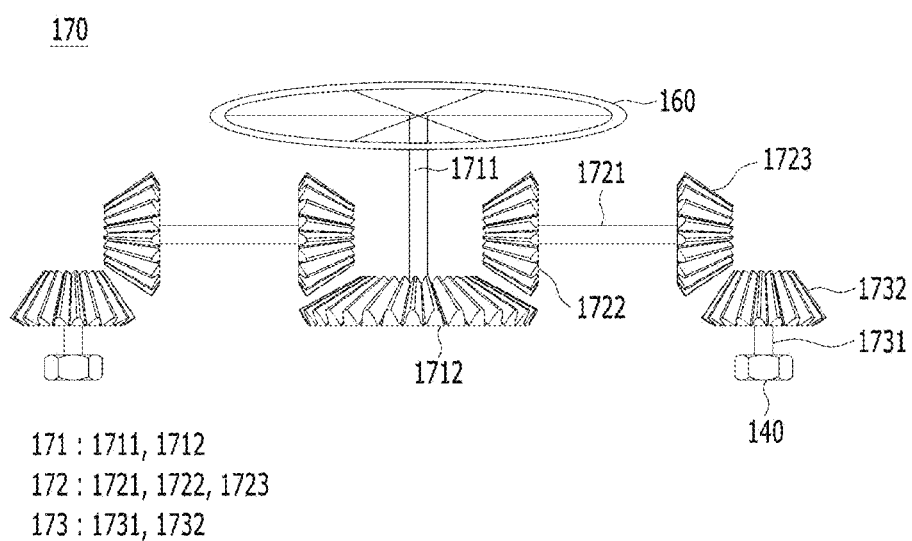
FIG. 4 is a schematic diagram showing a driving unit of a battery cell jig according to one embodiment of the present invention.

FIG. 4 is a schematic diagram showing a driving unit of a battery cell jig according to one embodiment of the present invention. Hereinafter, a driving unit 170 for transmitting rotating force of the rotating member 160 to n bolt fastening units 140 will be described with reference to FIG. 4.

In one embodiment, the driving unit 170 according to the present invention includes a first gear unit 171, a second gear unit 172, and a third gear unit 173. In a specific example, the driving unit 170 according to the present invention includes: a first gear unit 171 which is connected to the rotating member 160 and is rotated by rotation of the rotating member 160; a second gear unit 172 which is engaged with the first gear unit 171 and transmits rotating force in a direction other than an axial direction of the first gear unit 171; and a third gear unit 173 which is engaged with the second gear unit 172 and transmits rotating force in a direction other than an axial direction of the second gear unit 172. For example, the first gear unit 171 is rotated around the same rotation shaft as that of the rotating member 160, the direction of the rotation shaft of the second gear unit 172 may be perpendicular to that of the rotation shaft of the first gear unit, and the direction of the rotation shaft of the third gear unit 173 may be perpendicular to that of the rotation shaft of the second gear unit 172. More specifically, the driving unit 170 may include: a first gear unit 171 which is connected to the rotating member 160 and is rotated by rotation of the rotating member 160; n second gear units 172 which are engaged with the first gear unit 171 in a perpendicular direction and are rotated in a direction perpendicular to a rotating direction of the first gear unit 171; and a third gear unit 173 which is engaged with each of the second gear units 172 in a perpendicular direction and is rotated in a direction perpendicular to a rotating direction of the second gear unit 172. At this time, the third gear unit 173 may be connected to the bolt fastening unit 140 in a region opposite to a region where the third gear unit 173 is engaged with the second gear unit 172.

In a specific example, each of the gear units 171, 172 and 173 includes a rotation shaft and a bevel gear. The first gear unit 171 includes a first rotation shaft 1711 and a first driving bevel gear 1712. One side of the first rotation shaft 1711 is connected to the rotating member 160, and the first driving bevel gear 1712 is fixed at the other side of the first rotation shaft 1711. The first driving bevel gear 1712 is fixed at the other side of the first rotation shaft 1711 and is rotated by the rotating member 160. Namely, the first driving bevel gear 1712 may be rotated around the same rotation shaft as that of the rotating member.

Further, the second gear unit 172 includes a second rotation shaft 1721, a first follower bevel gear 1722, and a second driving bevel gear 1723. The first follower bevel gear 1722 is at one side of the second rotation shaft 1721, and the second driving bevel gear 1723 is fixed at the other side of the second rotation shaft 1721. At this time, the first follower bevel gear 1722 is engaged with the first driving bevel gear 1712 of the first gear unit 171, and the second driving bevel gear 1723 is engaged with the second follower bevel gear 1732 of the third gear unit 173 to be described later. Namely, the first follower bevel gear 1722 of the second gear unit 172 is engaged with the first driving bevel gear 1712 of the first gear unit 171 and may be rotated in a direction perpendicular to the first gear unit 171. Further, it may be rotated by the second driving bevel gear 1723 by rotation of the first follower bevel gear 1722.

Further, the third gear unit 173 includes a third rotation shaft 1731 and a second follower bevel gear 1732. The second follower bevel gear 1732 is fixed at one side of the third rotation shaft 1731, and the bolt fastening unit 140 is connected to the other side of the third rotation shaft 1731. At this time, the second follower bevel gear 1732 is engaged with the second driving bevel gear 1723 of the second gear unit 172. Namely, the second follower bevel gear 1732 of the third gear unit 173 may be engaged with the second driving bevel gear 1723 of the second gear unit and may be rotated in a direction perpendicular to the second gear unit 172. Further, rotating force of the second gear unit 172 may be transmitted to the third gear unit 173, and the third gear unit 173 may rotate the bolt fastening unit 140 connected to the other side of the third rotation shaft 1731.

In other words, the driving unit 170 of the battery cell jig 100 according to one embodiment of the present invention includes: a first gear unit 171 including a first rotation shaft 1711 connected to the rotating member 160 and a first driving bevel gear 1712 which is fixed at an end of the first rotation shaft 1711 and is rotated by the rotating member 160; n second gear units 172 including a first follower bevel gear 1722 engaged with the first driving bevel gear 1712, a second rotation shaft 1721 connected to the first follower bevel gear 1722, and a second driving bevel gear 1723 which is fixed at an end of the second rotation shaft 1721 and is rotated by rotation of the first follower bevel gear 1722; and a third gear unit 173 including a second follower bevel gear 1732 engaged with the second driving bevel gear 1723, and a third rotation shaft 1731 connected to the second follower bevel gear 1732. Herein, the third gear unit 173 is connected to the bolt fastening unit 140 in a region opposite to a region where the third gear unit 173 is engaged with the second follower bevel gear 1732.

The rotating force of the rotating member 160 may be transmitted to n bolt fastening units 140 by the above-described driving unit 170. As such, when the battery cell 110 is fixed between the first and second plates 120 and 130, bolts may be uniformly fastened.

Figure 5:
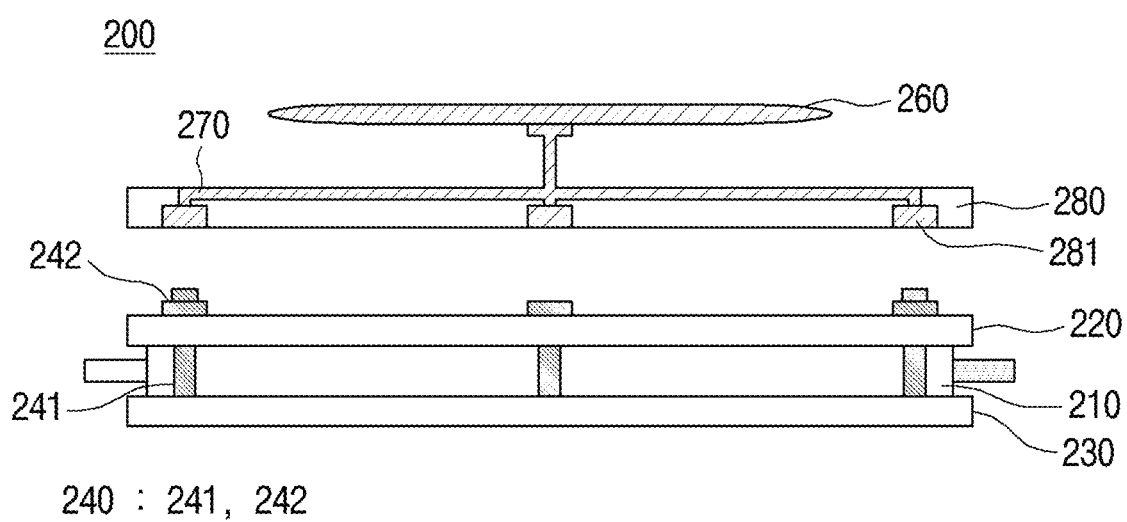
FIG. 5 is a schematic view of a battery cell jig according to another embodiment of the present invention.

FIG. 5 is a schematic view of a battery cell jig according to another embodiment of the present invention.

Referring to FIG. 5, a battery cell jig 200 according to the present invention includes: first and second plates 220 and 230 arranged to face each other; n (n is an integer equal to or greater than 2) bolt fastening units 240 including a bolt and a nut to allow the first plate 220 to be fastened to the second plate 230 to press a battery cell 210 in a state that the battery cell 210 is interposed between the first plate 220 and the second plate 230; a rotating member 260 which is installed on an opposite side of a surface where the first and second plates 220 and 230 face each other; and a driving unit 270 which transmits rotating force of the rotating member 260 to each of the n bolt fastening units 240.

In another embodiment, the battery cell jig 200 according to the present invention further includes a pressing plate 280 laminated on the upper surface which is one surface of the first plate 220. At this time, the pressing plate 280 has a driving unit 270 built therein.

Herein, in the driving unit 270, the first rotation shaft may protrude in the upward direction of the pressing plate 280 to be connected to the rotating member 260. Further, in the driving unit 270, the portion connected to the bolt fastening unit 240 may be included on the lower surface of the pressing plate 280.

In another embodiment, a connection unit 281 may be further included in a region connected to the bolt fastening unit 240 in the driving unit 270. For example, the connection unit 281 may have a groove corresponding to the shape of the bolt 241 or the nut 242 of the bolt fastening unit 240. In this case, the groove of the connection unit 281 may be fastened with the bolt 241 or the nut 242, and the driving unit 270 may transmit rotating force of the rotating member 260 to the connection unit 281. In this way, the bolt fastening unit 240 may perform bolt fastening.

Further, the pressing plate 280, which has the driving unit 270 built therein, may be detachable from the first plate 220. In a specific example, when the first and second plates 220 and 230 are fastened by bolts, the pressing plate 280 may be coupled to the upper portion of the first plate 220 to perform bolt fastening of bolt fastening unit 240 and may be detached from the first plate 220 while charging and discharging the battery cell 210.

Since the configuration of the driving unit 270 has been described above, the description of the concrete configuration and the operating mechanism of the driving unit is omitted here.

Figure 6:
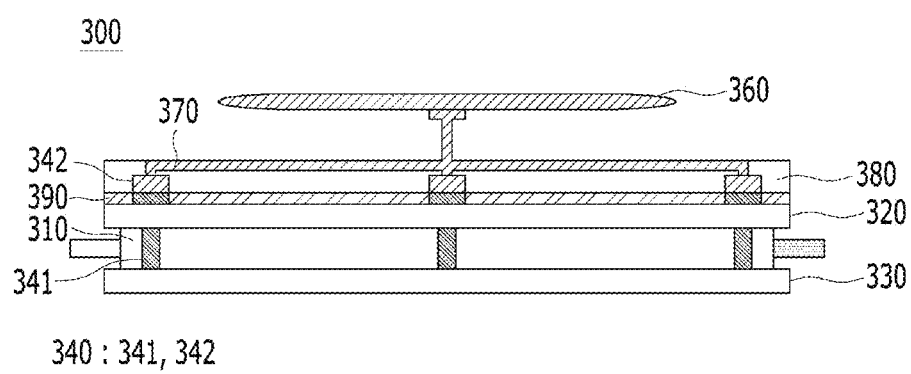
FIG. 6 is a schematic view of a battery cell jig according to further another embodiment of the present invention.
Figure 7:
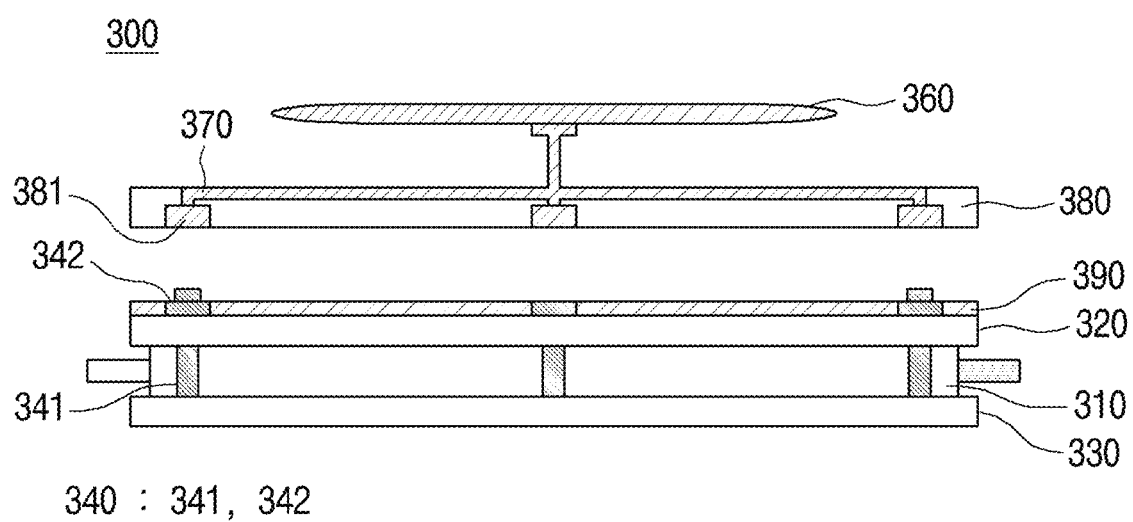
FIG. 7 is a schematic view of a battery cell jig according to further another embodiment of the present invention.

FIGS. 6 and 7 are schematic diagrams of a battery cell jig according to further another embodiment of the present invention.

Referring to FIGS. 6 and 7, a battery cell jig 300 according to the present invention includes: first and second plates 320 and 330 arranged to face each other; n (n is an integer equal to or greater than 2) bolt fastening units 340 including a bolt and a nut to allow the first plate 320 to be fastened to the second plate 330 to press a battery cell 310 in a state that the battery cell 310 is interposed between the first plate 320 and the second plate 330; a rotating member 360 which is installed on an opposite side of a surface where the first and second plates 320 and 330 face each other; and a driving unit 370 which transmits rotating force of the rotating member 360 to each of the n bolt fastening units 340.

In further another embodiment, the battery cell jig 300 according to the present invention further includes a pressing plate 380 laminated on the upper surface which is one surface of the first plate 320. At this time, the pressing plate 380 has a driving unit 370 built therein.

At this time, a sensor unit 390 may be further included between the first plate 320 and the pressing plate 380. In a specific example, the sensor unit 390 is arranged between the first plate 320 and the pressing plate 380 and measures a changing pressure value between the first plate 320 and the pressing plate 380 during rotation of the rotating member 360.

Specifically, the sensor unit 390 may include a pressure sensor having a planar structure. The pressure sensor having a planar structure may be disposed on the front surface of the first plate 320. As such, when the bolt fastening of the bolt fastening unit 340 is performed, even if pressure increases on a partial region between the first plate 320 and the pressing plate 380, pressure between the first plate 320 and the pressing plate 380 may be easily sensed.

For example, the pressure sensor may be a pressure distribution measurement sensor. The pressure distribution measurement sensor is a film-type pressure sensor and can simultaneously measure the pressure applied to thousands of sensor surfaces to thereby identify the shape of the pressure distribution. Then, analog signals of such a pressure distribution shape can be converted into digital signals, and the digital signals can be transmitted to a PC.

In further another example, the battery cell jig 300 according to the present invention includes an output unit which is connected to the sensor unit 290 and outputs a pressure value between the first plate 320 and the pressing plate 380 at the time of bolt fastening. Specifically, the output unit 395 may numerically calculate and display the pressure change between the first plate 320 and the pressing plate 380 at the time of bolt fastening, based on the signal inputted from the sensor unit.

Further, the pressing plate 380, which has the driving unit 370 built therein, may be detachable from the first plate 320. In a specific example, when the first and second plates 320 and 330 are fastened by bolts, the pressing plate 380 may be coupled to the upper portion of the first plate 320 to perform bolt fastening and may be detached from the first plate 320 while charging and discharging the battery cell 310.

Since the configuration of the driving unit 370 has been described above, the description of the concrete configuration and the operating mechanism of the driving unit is omitted here.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS 10, 100, 200, 300: battery cell jig
11, 110, 210, 310: battery cell
12, 120, 220, 320: first plate
13, 130, 230, 330: second plate
14: bolt
140, 240, 340: bolt fastening unit
15: nut
141, 241, 341: bolt
142, 242, 342: nut
160, 260, 360: rotating member
170, 270, 370: driving unit
171: first gear unit
   1711: first rotation shaft
   1712: first driving bevel gear
172: second gear unit
   1721: second rotation shaft
   1722: first follower bevel gear
   1723: second driving bevel gear
173: third gear unit
   1731: third rotation shaft
   1732: second follower bevel gear 280, 380: pressing plate
281, 381: connection unit
390: sensor unit

The invention claimed is:

1. A battery cell jig comprising:
first and second plates arranged to face each other and configured to hold a battery cell therebetween;
n bolt fastening units including a bolt and a nut to allow the first plate to be fastened to the second plate to press the battery cell, wherein n is an integer equal to or greater than 2;
a rotator installed on one surface of the first plate or the second plate and installed on an opposite side of a surface where the first and second plates face each other;
a driver configured to transmit rotating force of the rotator to each of the n bolt fastening units, wherein the driver includes:
a first gear unit connected to the rotator and configured to be rotated by rotation of the rotator;
a second gear unit configured to:
engage with the first gear unit, and
transmit the rotating force in a direction other than an axial direction of the first gear unit; and
a third gear unit configured to:
engage with the second gear unit, and
transmit the rotating force in a direction other than an axial direction of the second gear unit, wherein the third gear unit is connected to at least one bolt fastening unit among the n bolt fastening units in a first region opposite to a second region where the third gear unit is configured to engage with the second gear unit; and
a pressing plate laminated on the one surface of the first plate, wherein the pressing plate has the driver built therein.

2. The battery cell jig of claim 1, wherein the driver includes
n second gear units configured to:
engage with the first gear unit in a perpendicular direction, and
rotate in a direction perpendicular to a rotating direction of the first gear unit; and
wherein the third gear unit is configured to:
engage with each of the n second gear units in a perpendicular direction, and
rotate in a direction perpendicular to a rotating direction of the n second gear units, and
wherein the third gear unit is connected to the at least one bolt fastening unit in a region opposite to a region where the third gear unit is configured to engage with the n second gear units.

3. The battery cell jig of claim 1, wherein the first gear unit includes:
a first rotation shaft having one side connected to the rotator; and
a first driving bevel gear fixed at the other side of the first rotation shaft and configured to be rotated by the rotator.

4. The battery cell jig of claim 3, wherein the second gear unit includes:
a second rotation shaft;
a first follower bevel gear fixed at one side of the second rotation shaft and configured to engage with the first driving bevel gear; and
a second driving bevel gear fixed at the other side of the second rotation shaft and configured to be rotated by rotation of the first follower bevel gear.

5. The battery cell jig of claim 4, wherein the third gear unit includes:
a third rotation shaft; and
a third follower bevel gear fixed at one side of the third rotation shaft and configured to engage with the second driving bevel gear,
wherein the other side of the third rotation shaft is connected to the at least one bolt fastening unit.

6. The battery cell jig of claim 1,
wherein the first gear unit includes:
a first rotation shaft connected to the rotator, and
a first driving bevel gear fixed at an end of the first rotation shaft and configured to be rotated by the rotator;
wherein the driver includes n second gear units that include:
a first follower bevel gear configured to engage with the first driving bevel gear,
a second rotation shaft connected to the first follower bevel gear, and
a second driving bevel gear fixed at an end of the second rotation shaft and configured to be rotated by rotation of the first follower bevel gear; and
wherein the third gear unit includes:
a second follower bevel gear configured to engage with the second driving bevel gear, and
a third rotation shaft connected to the second follower bevel gear, and
wherein the third gear unit is connected to the at least one bolt fastening unit in a region opposite to a region where the third gear unit is configured to engage with the second driving bevel gear.

7. The battery cell jig of claim 1, wherein the driver is configured to be detachable from the first plate.

8. The battery cell jig of claim 1, further comprising a pressure sensor arranged between the first plate and the pressing plate and configured to measure a changing pressure value between the first plate and the pressing plate during rotation of the rotator.

9. The battery cell jig of claim 8, wherein the pressure sensor has a planar structure.

10. The battery cell jig of claim 2, wherein the first gear unit includes:
a first rotation shaft having one side connected to the rotator; and
a first driving bevel gear fixed at the other side of the first rotation shaft and configured to be rotated by the rotator.

11. The battery cell jig of claim 10, wherein the n second gear units include:
a second rotation shaft;
a first follower bevel gear fixed at one side of the second rotation shaft and configured to engage with the first driving bevel gear; and
a second driving bevel gear fixed at the other side of the second rotation shaft and configured to be rotated by rotation of the first follower bevel gear.

12. The battery cell jig of claim 11, wherein the third gear unit includes:
a third rotation shaft; and
a third follower bevel gear fixed at one side of the third rotation shaft and configured to engage with the second driving bevel gear, wherein the other side of the third rotation shaft is connected to the at least one bolt fastening unit.

13. The battery cell jig of claim 12, further comprising a pressure sensor arranged between the first plate and the pressing plate and configured to measure a changing pressure value between the first plate and the pressing plate during rotation of the rotator.

14. The battery cell jig of claim 13, wherein the pressure sensor has a planar structure.

15. The battery cell jig of claim 14, wherein the driver is configured to be detachable from the first plate.

16. The battery cell jig of claim 6, further comprising a pressure sensor arranged between the first plate and the pressing plate and configured to measure a changing pressure value between the first plate and the pressing plate during rotation of the rotator.

17. The battery cell jig of claim 16, wherein the pressure sensor has a planar structure.

18. The battery cell jig of claim 17, wherein the driver is configured to be detachable from the first plate.

* * * * *